United States Patent [19]
DeNicola, Jr. et al.

[11] Patent Number: 4,990,558
[45] Date of Patent: Feb. 5, 1991

[54] GRAFT COPOLYMER COMPOSITIONS

[75] Inventors: Anthony J. DeNicola, Jr., Newark; Paul D. Tatarka, Bear, both of Del.

[73] Assignee: Himont Incorporated, Wilmington, Del.

[21] Appl. No.: 499,115

[22] Filed: Mar. 26, 1990

[51] Int. Cl.$^5$ .................. C08L 51/06; C08L 53/02
[52] U.S. Cl. ................................ 524/504; 524/505; 525/71
[58] Field of Search .................. 524/504, 505; 525/71

[56] References Cited
U.S. PATENT DOCUMENTS 3,314,904 4/1967 Burkus .
4,386,187 5/1983 Grancio et al. .
4,556,691 12/1985 Castelein .
4,622,352 11/1986 Djiauw ............................ 524/505
4,661,549 4/1987 Walker ............................ 525/71
4,663,369 5/1987 Kawai et al. ..................... 524/504
4,871,805 10/1989 Shimomura et al. .

Primary Examiner—Jacob Ziegler

[57] ABSTRACT

Disclosed are compositions of (a) about from 60 to 95% of a graft copolymer comprising a styrene polymer grafted onto a propylene polymer material at a styrene polymer graft level of about 10–65%, and exhibiting a morphology in which the grafted styrene polymer is a dispersed phase and the propylene polymer material is the matrix phase, and (b) about from 40 to 5% of a rubber component comprising a monoalkenyl aromatic hydrocarbon-conjugated diene block copolymer, alone or in combination with a saturated (preferably, EPM) or unsaturated (preferably, EPDM) olefin copolymer rubber. These graft copolymer compositions are well-balanced with respect to impact strength and stiffness at high ductility levels. The compositions, which may be admixed with one or more additives such as inorganic fillers in an amount, for example, of up to about 80 parts additive per 100 parts of the graft copolymer and rubber component, are rigid thermoplastics useful as stand-alone structural materials.

23 Claims, No Drawings

GRAFT COPOLYMER COMPOSITIONS

FIELD OF THE INVENTION

The present invention relates to compositions comprising graft copolymers of a styrene polymer grafted onto a backbone or substrate of a propylene polymer material and, more particularly, to compositions based on graft copolymers which exhibit a heterophasic morphology characterized by a propylene polymer material as a continuous phase and a styrene polymer as a dispersed phase.

BACKGROUND INFORMATION

Graft copolymers formed by polymerizing monomers at active grafting sites on a polymer backbone constitute an interesting class of polymer hybrids because, although a single chemical species, they nevertheless are capable of displaying properties characteristic of the graft polymer as well as of the backbone polymer, rather than a simple averaging of the properties of the component polymers. When compared to physical blends of polymers, graft copolymers, owing to the intersegment chemical bonds therein, usually exhibit a finer heterophasic morphology in which the domain size of the dispersed phase is stable and may be smaller by about an order of magnitude. Moreover, the adhesion between phases is better. Physical blends of immiscible polymers, e.g., polypropylene and polystyrene, require the inclusion of a compatibilizer, e.g., a block copolymer suitably chosen, which can alleviate to some degree the problem associated with the high interfacial tension and poor adhesion between the immiscible polymers in the blend. Physical blends of polypropylene and polystyrene containing minor amounts of a styrenic block copolymer rubber as a compatibilizer for the polymers in the blend are described in U.S. Pat. No. 4,386,187.

Structural plastics based on a "chemical" blend of propylene and styrene polymers, i.e., based on a graft copolymer of a styrene polymer on a backbone of propylene polymer material, would fill a need in the art because of the benefits accruing from the fine domain structure in the graft copolymers and also because the necessary adhesion between the propylene polymer and styrene polymer phases would derive from the chemical bonds in the graft copolymer per se rather than depend on the action of an external agent, i.e., a compatibilizer. However, until now, the uses suggested for these graft copolymers have been limited chiefly to compatibilizers for immiscible polymer systems and components of gum plastic compositions.

U.S. Pat. No. 3,314,904 describes forming a "gum plastic" by making a graft copolymer of styrene on polyethylene or polypropylene, and, in particular, a graft interpolymer of styrene, acrylonitrile, and polyethylene or polypropylene, and blending the graft copolymer with certain selected compatible rubbery materials. The grafted styrene or styrene-acrylonitrile content of the graft copolymer is 75-95%, preferably 85-95%, and more preferably 90-95%. Hence the graft copolymer is predominantly bound styrene or bound styrene-acrylonitrile, and in the copolymers made from polypropylene the polypropylene is only a minor component and present as a dispersed phase. Thus the properties of the bound styrene or styreneacrylonitrile predominate. The graft copolymer is made by subjecting the polyolefin to high-energy ionizing radiation, and then contacting the irradiated polyolefin with styrene or with styrene and acrylonitrile.

However, for use as stand-alone structural plastics having the desirable properties of propylene polymers, e.g., excellent chemical resistance, good moisture resistance, etc., graft copolymers of a styrene polymer on a backbone of a propylene polymer material must exhibit a heterophasic morphology in which the propylene polymer is the continuous phase. This requires that the styrene polymer content of the graft copolymer not exceed about 65 percent by weight, while, at the same time, being high enough to improve the stiffness of the propylene polymer to the required degree.

The advantages of graft copolymers of a styrene polymer on a propylene polymer backbone over physical blends of the polymers as stand-alone structural plastics could be better utilized if a means were found for imparting a better balance of properties to the graft copolymers.

SUMMARY OF THE INVENTION

The present invention provides a graft-copolymer-based rigid thermoplastic composition comprising, by weight: (a) about from 60 to 95 percent of a graft copolymer comprising about from 10 to 65 percent by weight of a styrene polymer grafted onto a backbone of propylene polymer material, and, complimentarily, (b) about from 40 to 5 percent of a rubber component comprising (1) about from 20 to 100 percent by weight of (i) at least one monoalkenyl aromatic hydrocarbon-conjugated diene block copolymer, (ii) at least one block copolymer which is a hydrogenated product of (i), or (iii) a mixture of at least one (i) block copolymer with at least one (ii) block copolymer; and (2) from about 80 to 0 percent by weight of an olefin copolymer rubber, e.g., EPM (ethylene-propylene monomer rubber) or EPDM (ethylene-propylene-diene monomer rubber). The term "block copolymer", as used herein, denotes (i), (ii), or (iii) above. Up to about 80 parts (total) of additives such as fillers, reinforcing agents, etc. per 100 parts of the graft copolymer and the rubber component can be included in the composition. In addition, the composition may contain about from 5 to 30 parts of a propylene polymer material per 100 parts of the graft copolymer and the rubber component, wherein suitable propylene polymer materials are as set forth herein for the propylene polymer material useful in preparing the graft copolymer.

The term "styrene polymer", used herein to refer to the grafted polymer present on the backbone of propylene polymer material in the graft copolymer component of the composition of the invention, denotes (a) homopolymers of styrene or of an alkyl styrene having at least one $C_1$-$C_4$ linear or branched alkyl ring substituent, especially a p-alkyl styrene; (b) copolymers of the (a) monomers with one another in all proportions; and (c) copolymers of at least one (a) monomer with alpha-methyl derivatives thereof, e.g., alpha-methylstyrene, wherein the alpha-methyl derivative constitutes about from 1 to 40% of the weight of the copolymer.

Modifying graft copolymers of styrene polymers on substrates of propylene polymer material by blending with a monoalkenyl aromatic hydrocarbon-conjugated diene block copolymer unexpectedly has been found to improve the impact strength and ductility of the graft copolymers to an unusually high degree, as compared to modification with olefin copolymer rubbers alone.

Moreover, with rubber modifiers containing monoalkenyl aromatic hydrocarbon-conjugated diene block copolymers, the modification is accomplished more efficiently, i.e., a given degree of improvement in impact strength and ductility can be achieved at lower addition levels of rubber modifier, thus preserving more of the graft copolymer's stiffness.

In one embodiment of the present composition, the block copolymer comprises all of the rubber component. Alternatively, about from 1 to 80 percent by weight of the rubber component is an olefin copolymer rubber, e.g., EPM or EPDM, and the remainder, i.e., about from 99 to 20 percent, is the monoalkenyl aromatic hydrocarbon-conjugated diene block copolymer. In the latter embodiment, not only is the combination rubber component advantageous as compared to modification with EPM or EPDM alone, but, surprisingly, in many instances, for a given total amount of rubber component in the composition, the use of the monoalkenyl aromatic hydrocarbon-conjugated diene block copolymer together with the EPM or EPDM gives a greater improvement in the graft copolymer's impact strength and ductility than is obtained with the block copolymer alone.

DETAILED DESCRIPTION

The major component of the composition of the invention is a graft copolymer of about from 10 to 65, preferably about from 10 to 55, weight percent styrene polymer grafted onto a backbone of propylene polymer material, which graft copolymer exhibits a heterophasic morphology characterized by a propylene polymer continuous or matrix phase and a styrene polymer dispersed phase. About from 60 to 95, and preferably about from 70 to 90, percent of the composition by weight is comprised of the graft copolymer. Mixed or blended with the graft copolymer is a rubber component which comprises about from 5 to 40, and preferably about from 10 to 30, percent by weight of the composition. The rubber component is comprised, by weight, of at least about 20, and preferably at least about 50, percent of a monoalkenyl aromatic hydrocarbon-conjugated diene block copolymer. This block copolymer is a thermoplastic elastomer of the A-B (or diblock) structure, the linear A-B-A (or triblock) structure, the radial (A-B)n type where n=3-20% or a combination of these structure types, wherein each A block is a monoalkenyl aromatic hydrocarbon polymer block, e.g. a styrene polymer, and B is an unsaturated rubber block, such as polymeric butadiene or isoprene. Various grades of copolymers of this type are commercially available. The grades differ in structure, molecular weight of mid and end blocks, and ratio of monoalkenyl aromatic hydrocarbon to rubber. In mixtures of two or more block copolymers (one or more of which may be hydrogenated), the structure types may be the same or different.

Typical monoalkenyl aromatic hydrocarbon monomers are styrene, ring-substituted $C_1$–$C_4$ linear or branched alkyl styrenes, and vinyl toluene. Styrene is preferred. Suitable conjugated dienes are butadiene and isoprene.

The average molecular weight of the block copolymer generally will be in the range of about from 45,000 to 260,000 g/mole, average molecular weights in the range of about from 50,000 to 125,000 g/mole being preferred on the basis that they afford blend compositions having the best balance of impact strength and stiffness. Also, while block copolymers having unsaturated as well as saturated rubber blocks can be used, copolymers having saturated rubber blocks are preferred also on the basis of the impact/stiffness balance of the compositions containing them. The weight ratio of monoalkenyl aromatic hydrocarbon to conjugated diene rubber in the block copolymer is in the range of about from 5/95 to 50/50, preferably about from 10/90 to 40/60.

The examples which follow show that outstanding improvements are achieved in the impact strength and ductility of graft copolymers of a styrene polymer grafted onto a propylene polymer material when a 100 percent block copolymer rubber is blended therewith. The rubber component in the present composition also may comprise two or more types of polymer rubbers, provided that at least about 20, and preferably at least about 50, percent of the component is at least one monoalkenyl aromatic hydrocarbon-conjugated diene block copolymer. An especially preferred rubber component is one comprised of about from 20 to 70, more preferably about from 50 to 70, percent of a monoalkenyl aromatic hydrocarbon-conjugated diene block copolymer and about from 80 to 30, more preferably about from 50 to 30, percent of an EPM or EPDM olefin copolymer rubber. A rubber component comprised of the block copolymer and, instead of the olefin copolymer rubber, a butyl rubber or a random copolymer of butadiene-styrene (SBR) may be used in the present composition.

The ethylene/propylene monomer rubber used in the preferred composition of the invention is an elastomer typically having an ethylene/propylene weight percent ratio in the range of about from 25/75 to 75/25, preferably about from 40/60 to 60/40, and an intrinsic viscosity in the range of about from 2.0 to 6.0, preferably about from 2.5 to 4.0, dl/g.

The propylene polymer material which forms the backbone or substrate of the graft copolymer is (a) a homopolymer of propylene; (b) a random copolymer of propylene and an olefin selected from the group consisting of ethylene and $C_4$–$C_{10}$-olefins, provided that, when the olefin is ethylene, the maximum polymerized ethylene content is about 10 (preferably about 4) percent by weight, and when the olefin is a $C_4$–$C_{10}$-olefin, the maximum polymerized content thereof is about 20 (preferably about 16) percent by weight; (c) a random terpolymer of propylene and an olefin selected from the group consisting of ethylene and $C_4$–$C_8$ 1-olefins, provided that the maximum polymerized $C_4$–$C_8$ 1-olefin content is about 20 (preferably about 16) percent by weight, and, when ethylene is one of the olefins, the maximum polymerized ethylene content is about 5 (preferably about 4) percent by weight; or (d) a homopolymer or random copolymer of propylene which is impact-modified with an ethylene-propylene monomer rubber in the reactor as well as by physical blending, the ethylene-propylene monomer rubber content of the modified polymer being in the range of about from 5 to 30 percent, and the ethylene content of the rubber being in the range of about from 7 to 70, and preferably about from 10 to 40, percent. The $C_4$–$C_{10}$-olefins include the linear and branched $C_4$–$C_{10}$-olefins such as, for example, 1-butene, 1-pentene, 3-methyl-1-butene, 4-methyl-1-pentene, 1-hexene, 3,4-dimethyl-1-butene, 1-heptene, 3-methyl-hexene, and the like. Propylene homopolymers and impact-modified propylene homopolymers are preferred propylene polymer materials. Although not preferred, propylene homopolymers and random copolymers impact modified with an ethylene-propylene-diene monomer rubber having a diene content of about 2–8% also can be used as the propylene polymer material within the broadest aspects of the present invention. Suitable dienes are dicyclopentadiene, 1,6-hexadiene, and ethylidene norbornene.

As was stated previously, the grafted polymer present on the backbone of propylene polymer material in the graft copolymer component of the composition of the invention is a styrene polymer. The styrene polymer portion of the graft copolymer constitutes about from 10 to 65, preferably about from 10 to 55, and more preferably about from 25 to 50, percent of the weight of the graft copolymer. As a consequence, the morphology of the graft copolymer is such that the propylene polymer material is the continuous or matrix phase, and the styrene polymer is a dispersed phase.

The graft copolymer which forms the principal component of the present composition can be made according to any one of various methods. One of these methods involves forming active grafting sites on the propylene polymer material either in the presence of the grafting monomer, or followed by treatment with the monomer. The grafting sites may be produced by treatment with a peroxide or other chemical compound which is a free-radical polymerization initiator, or by irradiation with high-energy ionizing radiation. The free radicals produced in the polymer as a result of the chemical or irradiation treatment form the active grafting sites on the polymer and initiate the polymerization of the monomer at these sites. Graft copolymers produced by peroxide-initiated grafting methods are preferred.

In a peroxide-initiated method, the propylene polymer material is treated at a temperature of about from 60° to 125° C., preferably about from 80° to 120° C., with about from 0.1 to 6, preferably about from 0.2 to 3.0, pph (parts by weight per 100 parts by weight of the propylene polymer material) of an initiator having a decomposition half-life of about from 1 to 240, preferably about from 5 to 100, and more preferably about from 10 to 40, minutes at the temperature employed. Organic peroxides, and especially those which generate alkoxy radicals, constitute the preferred class of initiators. These include acyl peroxides, such as benzoyl and dibenzoyl peroxides; dialkyl and aralkyl peroxides, such as di-tert-butyl peroxide, dicumyl peroxide, cumyl butyl peroxide, 1,1-di-tert-butylperoxy-3,5,5-trimethylcyclohexane, 2,5-dimethyl-2,5-di-tert-butylperoxyhexane, and bis(alpha-tert-butyl peroxyisopropylbenzene); peroxy esters, such as tertbutylperoxypivalate, tert-butyl perbenzoate, 2,5-dimethylhexyl 2,5-di(perbenzoate), tert-butyl di(perphthalate), tert-butylperoxy-2-ethyl hexanoate: and 1,1-dimethyl-3-hydroxybutylperoxy-2-ethyl hexanoate; and peroxy carbonates, such as di(2-ethylhexyl) peroxy dicarbonate, di(n-propyl)peroxy dicarbonate, and di(4-tert-butylcyclohexyl)peroxy dicarbonate.

Over a time period which coincides with, or follows, the period of initiator treatment, with or without overlap, the propylene polymer material is treated with about from 10 to 70 percent by weight of the grafting monomer(s), based on the total weight of propylene polymer material and grafting monomer(s) used, at a rate of addition which does not exceed about 4.5, preferably does not exceed about 4.0, and more preferably does not exceed about 3.0, pph per minute at any monomer addition level. If the monomer is added after the initiator addition period, preferably no more than about 2.5 initiator half-lives separate the initiator and monomer addition periods.

After the grafting period, any unreacted monomer is removed from the resultant grafted propylene polymer material, and any unreacted initiator is decomposed and any residual free radicals are deactivated, preferably by heating, generally at a temperature of at least about 110° C. for at least about 5 minutes, preferably at least about 120° C. for at least about 20 minutes. A substantially non-oxidizing environment is maintained throughout the process.

In a method wherein the active grafting sites are produced by irradiation, the propylene polymer material is irradiated at a temperature in the range of about from 10° to 85° C. with high-energy ionizing radiation, and the irradiated polymer material is treated, at a temperature of about from 10° to 100° C., preferably about from 10° to 70° C., and more preferably about from 10° to 50° C., for at least about 3 minutes, preferably at least about 10 minutes in a semi-batch process and preferably about 30–60 minutes in a continuous process, with about from 10 to 70 percent by weight of the grafting monomer(s), based on the total weight of propylene polymer material and grafting monomer(s) used. Thereafter, simultaneously or successively in optional order, substantially all residual free radicals in the resultant grafted propylene polymer material are deactivated, and any unreacted monomer is removed from the material. The propylene polymer material is maintained in a substantially non-oxidizing environment, e.g., under inert gas, throughout the process at least until after the deactivation of residual free radicals has been completed. The deactivation of free radicals preferably is accomplished by heating, e.g., at temperatures of at least about 110° C., preferably at least about 120° C., generally for at least about 20 minutes.

A preferred graft copolymer for use in the present composition is in the form of uniformly grafted particles obtained from propylene polymer particles having (a) a pore volume fraction of at least about 0.07, more preferably at least about 0.12, and most preferably at least about 0.20, wherein more than 40%, more preferably more than 50%, and most preferably more than 90%, of the pores have a diameter larger than 1 micron; (b) a surface area of at least 0.1 m$^2$/g; and (c) a weight average diameter in the range of about from 0.4 to 7 mm.

The preferred composition of the invention, in which the rubber component contains a monoalkenyl aromatic hydrocarbon-conjugated diene block copolymer and an ethylene/propylene monomer rubber, can be a physical blend of the two rubber ingredients with the graft copolymer. When the composition is a blend of the monoalkenyl aromatic hydrocarbon-conjugated diene block copolymer with a graft copolymer in which a styrene polymer has been grafted onto a propylene homopolymer or random copolymer that has been impact-modified with ethylene/propylene monomer rubber in an amount sufficient to provide all or a portion of the EPM which one desires to incorporate into the composition, all or some of the EPM in the composition is a component of the graft copolymer per se.

Fillers and reinforcing agents, e.g., carbon black and glass fibers, as well as inorganic powders such as calcium carbonate, talc, mica, and glass, may be included in the composition of the invention at concentration levels up to about 80 parts by weight per 100 parts by weight of total graft copolymer and rubber component.

In addition to the economic benefit such fillers afford, greater stiffness and a higher heat distortion temperature can be attained.

The components of the composition can be blended or admixed in any conventional mixing apparatus, such as an extruder or a Banbury mixer.

The following examples, presented for illustrative purposes, describe various embodiments of the graft-copolymer-based composition of the invention.

In all of the examples and control experiments, the graft copolymer and monoalkenyl aromatic hydrocarbon-conjugated diene block copolymer, as well as any other modifier used, were mixed and extruded in a single- or double-pass through a Brabender twin-screw extruder (Example 15 and Control 7); compounded in a Banbury mixer and extruded in one pass through a Brabender single-screw (Examples 3 and 13); or compounded in the Banbury mixer and extruded in one pass through the Brabender twin-screw (Examples 1, 2, 4–12, and 14, and Controls 1–6). A stabilizer composition (0.2 weight %), known as P-EPQ, the main component of which is tetrakis (2,4-di-tert-butyl-phenyl)-4,4′-biphenylene diphosphonite, was added to all batches before compounding to minimize oxidation. The extruder temperature was in the 200°–245° C. range, except for the melt zone, which was at 250°–265° C. The extruded blends were molded into test specimens (tensile bars, flexural bars, and 0.32×7.6×7.6 cm plaques).

The test methods used to evaluate the molded specimens were ASTM D-256 (notched Izod impact), ASTM D-638 (tensile strength), ASTM D-638 (elongation at break), ASTM D-790 (flexural modulus), and ASTM-648 (HDT at 1820 kPa).

EXAMPLES 1–6

Six compositions of the invention were made and tested as described above. In these compositions the block copolymer was a styrene block copolymer (SBC). Six control compositions containing no monoalkenyl aromatic hydrocarbon-conjugated diene block copolymer also were made and tested in the same manner. The compositions contained a graft copolymer of a styrene homopolymer grafted onto a propylene homopolymer backbone made by the previously described peroxide-initiated graft polymerization process wherein an oxygen-free mineral spirit solution of tert-butylperoxy 2-ethylhexanoate was sprayed onto the heated polypropylene (100° C.) and, after a short hold time, styrene was sprayed in. The following grafting conditions were used to prepare the graft copolymers of (a) Examples 1 and 6 and Controls 1 and 2: 1 pph peroxy ester, hold 15 minutes, 54 pph styrene added at 1.64 pph/min., hold 3 hours at 100° C., then 4 hours at 135° C. with nitrogen purge to deactivate and dry; (b) Examples 2, 4, and 5 and Controls 3–6: the same as (a) except 2.35 pph peroxy ester, hold 10 minutes, and 84.4 pph styrene added at 2.4 pph/min; and (c) Example 3: the same as (b) except 0.79 pph peroxy ester and hold 2 hours at 104° C. after styrene addition and before nitrogen purge. All pph peroxy ester values are on an active basis.

The propylene polymer used in the preparation of the graft copolymer was a finely divided porous propylene homopolymer (LBD-406A, commercially available from HIMONT Italia S.p.A.) in the form of generally spherical particles having the following characteristics: nominal melt flow rate (ASTM Method D 1238-82, Condition L) 8 dg/min; intrinsic viscosity (method of J. H. Elliott et al., J. Applied Polymer Sci. 14, 2947–2963 (1970)—polymer dissolved in decahydronaphthalene at 135° C.) 2.4 dl/g; surface area (B.E.T.) 0.34 m$^2$/g; weight average diameter 2.0 mm; and pore volume fraction (mercury porosimetry method) 0.33. More than 90% of the pores in the porous particles were larger than 1 micron in diameter.

The results of the evaluations performed on the Example 1–6 compositions and six control compositions are shown in Table I.

TABLE I

| | Example No. | | | | | | Control No. | | | | | |
|---|---|---|---|---|---|---|---|---|---|---|---|---|
| | 1 | 2 | 3 | 4 | 5 | 6 | 1 | 2 | 3 | 4 | 5 | 6 |
| Polystyrene in Graft Copolymer (wt %) | 31 | 42 | 42 | 42 | 42 | 31 | 31 | 31 | 42 | 42 | 42 | 42 |
| Graft Copolymer (wt %) | 85 | 85 | 85 | 80 | 75 | 92.5 | 100 | 85 | 100 | 85 | 80 | 75 |
| SBC (wt %) | 15[a] | 15[a] | 15[b] | 20[a] | 25[a] | 7.5[a] | — | — | — | — | — | — |
| EPM (wt %)[c] | — | — | — | — | — | — | — | 15 | — | 15 | 20 | 25 |
| Notched Izod Impact at 23° C. | | | | | | | | | | | | |
| ft-lbf/in | 6.1 | 3.2 | 2.1 | 7.4 | 16.4 | 1.6 | 0.3 | 1.5 | 0.3 | 1.4 | 4.2 | 7.7 |
| (J/m) | (326) | (171) | (113) | (397) | (873) | (84) | (18) | (78.5) | (13.3) | (74.2) | (226) | (411) |
| Flexural Modulus | | | | | | | | | | | | |
| 1% secant psi | 192,800 | 231,900 | 161,400 | 177,300 | 146,500 | 240,200 | 329,700 | 230,700 | 350,500 | 240,700 | 223,000 | 190,500 |
| (MPa) | (1330) | (1599) | (1113) | (1223) | (1010) | (1657) | (2274) | (1591) | (2417) | (1681) | (1538) | (1314) |
| Tensile Strength psi | 3942 | 4679 | 3088 | 3670 | 3338 | 4594 | 5415 | 3737 | 6024 | 4303 | 3401 | 2966 |
| (MPa) | (27.2) | (32.3) | (21.3) | (25.3) | (23.0) | (31.7) | (37.3) | (25.8) | (41.5) | (29.7) | (23.4) | (20.4) |
| Elongation (at break) (%) | 253 | 97 | 114 | 82 | 246 | 99 | 31 | 96 | 3.8 | 34 | 60 | 56 |
| HDT @ 264 psi (1820 kPa) (°C.) | 55 | 63 | — | 57 | 52 | 55 | 71 | 55 | 69 | 68 | 64 | 60 |

[a]Low molecular weight; hydrogenated; triblock (S-EB-S); styrene/rubber ratio 29/71; Kraton G-1652.
[b]Medium-to-low molecular weight; hydrogenated; styrene/rubber ratio 13/87, 30% diblock (styrene-ethylene/propylene), 70% triblock (S-EB-S); Kraton G-1657.
[c]Ethylene/propylene weight ratio 57/43; intrinsic viscosity 3.37 dl/g.

EXAMPLES 7–14

Compositions were prepared using the procedure and ingredients described in Example 1 except that in these examples the rubber component was made up of two ingredients. The following grafting conditions were used to prepare the graft copolymers of (a) Examples 7, 11, and 12 and Control 7: 1 pph peroxy ester, hold 10–15 minutes, 54 pph styrene added at 1.6–1.8 pph/min, hold 3 hours at 100° C., then 4 hours at 135° C. (except 100° C. in Example 12 and Control 7) with nitrogen purge tp deactivate and dry; (b) Examples 8–10 and 13: the same as (a) except 2.35 pph peroxy ester, hold 10 minutes, and 84.4 pph styrene added at 2.4 pph/min; and (c) Example 14: the same as (b) except 0.79 pph peroxy ester and hold 2 hours at 104° C. after styrene addition and before nitrogen purge.

The results of the evaluations performed on these compositions, and on a control composition containing no monoalkenyl aromatic hydrocarbon-conjugated diene, block copolymer, are summarized in Table II.

mixture of styrene and alpha-methylstyrene, was sprayed onto the polypropylene. The conditions used to prepare the graft copolymer were: 1.57 pph peroxy ester, hold 10 minutes, 76 pph styrene and 8.4 pph alpha-methylstyrene added at 2.4 pph/min, hold 3 hours at 102° C., then 4 hours at 133° C. with nitrogen purge.

The graft level (total styrene/alpha-methylstyrene

TABLE II

| | Ex. 7 | Ex. 8 | Ex. 9 | Ex. 10 | Ex. 11 | Ex. 12 | Ex. 13 | Ex. 14 | Control 7 |
|---|---|---|---|---|---|---|---|---|---|
| Polystyrene in Graft Copolymer (wt %) | 31 | 42 | 42 | 42 | 31 | 31 | 42 | 42 | 31 |
| Graft Copolymer (wt %) | 85 | 80 | 80 | 90 | 70 | 85[a] | 85 | 85 | 100[a] |
| SBC (wt %) | 7.5 | 6.67 | 13.33 | 3.33 | 15 | 15 | 7.5[b] | 7.5 | — |
| EPM (wt %) | 7.5 | 13.33 | 6.67 | 6.67 | 15 | — | 7.5 | — | — |
| Butyl Rubber[c] | — | — | — | — | — | — | — | 7.5 | — |
| Notched Izod Impact at 23° C. | | | | | | | | | |
| ft-lbf/in | 10.3 | 11.0 | 12.6 | 1.6 | 12.3 | 10.3 | 2.7 | 1.5 | 1.5 |
| (J/m) | (550) | (586) | (673) | (87.5) | (657) | (550) | (143) | (80.6) | (78) |
| Flexural Modulus | | | | | | | | | |
| 1% secant psi | 203,100 | 191,300 | 171,900 | 246,000 | 119,100 | 115,700 | 246,000 | 175,000 | 218,500 |
| (MPa) | (1401) | (1319) | (1185) | (1697) | (821) | (798) | (1696) | (1207) | (1507) |
| Tensile Strength psi | 3774 | 3129 | 3183 | 4518 | 2818 | 3684 | 4499 | 3435 | 4158 |
| (MPa) | (26.0) | (21.6) | (22.0) | (31.2) | (19.4) | (25.4) | (31.0) | (23.7) | (28.7) |
| Elongation (at break) (%) | 299 | 133 | 155 | 26 | 433 | 436 | 57 | 65 | 6 |

[a] Polystyrene grafted onto EPM-modified polypropylene having a polypropylene content of about 85% and an EPM content of about 15% (ethylene content of about 57%), thus providing 8.8% EPM in the Ex. 12 composition, and 10% EPM in Control 7.
[b] High molecular weight; unsaturated; SBS of predominantly radial structure; styrene/rubber ratio 30/70; Kraton D-1184.
[c] Mooney viscosity of 70 [ML (1 + 8) 100° C.].

EXAMPLE 15

The procedure and ingredients described in Example 1 were repeated with the exception that the propylene polymer used was an ethylene/propylene random copolymer having an ethylene content of about 3.6%, and the styrene was graft polymerized at free-radical sites produced on the random copolymer by high-energy ionizing radiation as previously described. The radiation dose was 4 Mrad, and the radiation chamber was at ambient temperature (about 23° C.). Two minutes after the irradiation was completed, 147 pph styrene was sprayed onto the irradiated copolymer at ambient temperature (23° C.) at a rate of 23 pph/min for 6.5 min, and the styrene and irradiated copolymer were agitated at this temperature for up to 30 minutes. Thereafter, the reactor temperature was increased to 140° C. and agitation continued for an additional 30 minutes to deactivate any residual free radicals. Any excess monomer was removed by a nitrogen purge. A nitrogen atmosphere was maintained in the radiation chamber and in the grafting reactor (oxygen level below 0.004% by volume). The graft level (polystyrene) in the resultant graft copolymer was 44 pph.

The blend composition had the following properties:

| | |
|---|---|
| Notched Izod Impact at 23° C. | 2.8 ft-lbf/in (150 J/m) |
| Flexural Modulus (1% secant) | 110,700 psi (763 MPa) |
| Tensile Strength | 2445 psi (16.8 MPa) |
| Elongation (at break) | 73% |

EXAMPLES 16-17

The procedure and ingredients described in Examples 1 (Example 16) and 7 (Example 17) were repeated except that in the preparation of the graft copolymer a copolymer) in the graft copolymer was about 45%. The styrene/alpha-methylstyrene ratio in the graft copolymer was about 9/1. The results are shown in Table III:

TABLE III

| | Ex. 16 | Ex. 17 | Control 8 | Control 9 |
|---|---|---|---|---|
| Graft Copolymer (wt %) | 85 | 85 | 100 | 85 |
| SBC (wt %) | 15 | 7.5 | — | — |
| EPM (wt %) | — | 7.5 | — | 15 |
| Notched Izod Impact at 23° C. ft-lbf/in | 1.9 | 1.8 | 0.3 | 0.5 |
| (J/m) | (101) | (94) | (17) | (27) |
| Flexural Modulus psi | 216,300 | 219,000 | 352,800 | 246,300 |
| 1% secant - (MPa) | (1492) | (1510) | (2433) | (1699) |
| Tensile Strength psi | 4294 | 4006 | 6138 | 4055 |
| (MPa) | (29.6) | (27.6) | (42.3) | (28.0) |
| Elongation (at break) (%) | 65 | 96 | 3.9 | 3.5 |
| HDT at 264 psi (1820 kPa) (°C.) | 63.5 | 63 | 69 | 68 |

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A composition comprising, by weight:
   (a) about from 60 to 95 percent of a graft copolymer comprising about from 10 to 65 percent by weight of a styrene polymer grafted onto a backbone of a propylene polymer material, and
   (b) about from 40 to 5 percent of a rubber component comprising (1) about from 20 to 100 percent by weight of (i) at least one monoalkenyl aromatic hydrocarbon-conjugated diene block copolymer, (ii) at least one block copolymer which is a hydrogenated product of (i), or (iii) a mixture of at least one (i) block copolymer with at least one (ii) block copolymer; and (2) from about 80 to 0 percent by weight of an olefin copolymer rubber.

2. The composition of claim 1 wherein (a) is present in an amount about from 70 to 90 percent, and (b) is present in an amount about from 30 to 10 percent.

3. The composition of claim 1 wherein (b) is about from 20 to 70 percent by weight of the monoalkenyl aromatic hydrocarbon-conjugated diene block copolymer and about from 80 to 30 percent by weight of the olefin copolymer rubber.

4. The composition of claim 1 wherein the propylene polymer material of (a) is selected from the group consisting of propylene homopolymers, propylene random copolymers with other 1-olefins, and propylene homopolymers impact-modified with an ethylene-propylene monomer rubber.

5. The composition of claim 4 wherein the propylene polymer material is a homopolymer.

6. The composition of claim 1 wherein the olefin copolymer rubber is present in an amount from about 1 to about 80 percent and is an ethylene-propylene monomer rubber or an ethylene-propylene-diene monomer rubber.

7. The composition of claim 6 wherein all or a portion of the olefin copolymer rubber is provided by an impact modified propylene polymer material.

8. The composition of claim 7 wherein the olefin copolymer rubber is an ethylene-propylene monomer rubber.

9. The composition of claim 1 wherein (b) is about from 50 to 70 percent by weight of the monoalkenyl aromatic hydrocarbon-conjugated diene block copolymer and about from 50 to 30 percent by weight of the olefin copolymer rubber.

10. A composition of claim 6 wherein butyl rubber or a random copolymer of butadiene-styrene is used instead of the olefin copolymer rubber.

11. A composition of claim 1 wherein the weight of styrene polymer grafted onto the backbone of propylene polymer material is about from 10 to 55 percent of the weight of the graft copolymer.

12. A composition of claim 1 wherein the weight of styrene polymer grafted onto the backbone of propylene polymer material is about from 25 to 50 percent of the weight of the graft copolymer.

13. A composition of claim 1 wherein the styrene polymer grafted onto the backbone of a propylene polymer material is polystyrene.

14. A composition of claim 1 wherein the styrene polymer is a copolymer of styrene and alpha- or para-methylstyrene.

15. A composition of claim 1 wherein the monoalkenyl aromatic hydrocarbon-conjugated diene block copolymer is of the A-B or A-B-A type wherein each A is a polymeric monoalkenyl aromatic hydrocarbon-conjugated diene block and B is a polymeric rubber block of a conjugated diene.

16. A composition of claim 15 wherein each A is a polymeric styrene block.

17. A composition of claim 16 wherein the monoalkenyl aromatic hydrocarbon-conjugated diene block copolymer has an average molecular weight in the range of about from 50,000 to 125,000 g/mole.

18. A composition of claim 16 wherein the A/B weight ratio in the monoalkenyl aromatic hydrocarbon-conjugated diene block copolymer is in the range of about from 5/95 to 50/50.

19. A composition of claim 15 wherein the B block is hydrogenated.

20. A composition of claim 15 wherein the conjugated diene is selected from the group consisting of butadiene and isoprene.

21. A composition of claim 1 wherein the graft copolymer is the product of a peroxide-initiated graft polymerization of styrene on a propylene polymer material.

22. A composition of claim 1 further comprising, per 100 parts by weight of (a) and (b), up to about 80 parts by weight of one or more additives selected from the group consisting of fillers, reinforcing agents, and inorganic powders.

23. A composition of claim 1 further comprising about from 5 to 30 parts of a propylene polymer material per 100 parts of (a) and (b).

* * * * *

UNITED STATES PATENT AND TRADEMARK OFFICE
CERTIFICATE OF CORRECTION

PATENT NO. : 4,990,558

DATED : February 5, 1991

INVENTOR(S) : Anthony J. DeNicola, Jr., et al.

It is certified that error appears in the above-identified patent and that said Letters Patent is hereby corrected as shown below:

At col. 3, line 46, delete "%".

At col. 4, lines 42, 45, 62 and 63, change "$C_4$-$C_{10}$-olefins" to --$C_4$-$C_{10}$ 1-olefins--.

At col. 4, line 66, change "methyl-hexene" to --methyl-1-hexene--.

At col. 5, line 56, change "ethylhexyl) peroxy" to --ethylhexyl)peroxy--.

At col. 7, line 36, delete "5" before "graft".

At col. 8, line 18, change "S.p.A." to --S.r.l.--.

At col. 8, line 65, change "tp" to --to--.

Signed and Sealed this

Thirtieth Day of June, 1992

Attest:

DOUGLAS B. COMER

*Attesting Officer*     *Acting Commissioner of Patents and Trademarks*